(12) United States Patent
Shafik et al.

(10) Patent No.: US 12,393,706 B2
(45) Date of Patent: Aug. 19, 2025

(54) CLASSIFYING DATA AND ENFORCING DATA ACCESS CONTROL USING A CONTEXT-BASED HIERARCHICAL POLICY

(71) Applicant: EMC IP Holding Company LLC, Hopkinton, MA (US)

(72) Inventors: Farida Shafik, Cairo (EG); Joel Christner, San Jose, CA (US); Nicole Reineke, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 198 days.

(21) Appl. No.: 17/364,131

(22) Filed: Jun. 30, 2021

(65) Prior Publication Data

US 2023/0004663 A1    Jan. 5, 2023

(51) Int. Cl.
*G06F 21/62* (2013.01)
*G06F 16/16* (2019.01)
*H04L 9/40* (2022.01)

(52) U.S. Cl.
CPC ............ *G06F 21/62* (2013.01); *G06F 16/164* (2019.01); *H04L 63/10* (2013.01)

(58) Field of Classification Search
CPC ........... G06F 21/62–629; G06F 16/164; H04L 63/10–108
See application file for complete search history.

(56) References Cited

U.S. PATENT DOCUMENTS

| | | | |
|---|---|---|---|
| 2009/0300712 A1* | 12/2009 | Kaufmann | G06F 21/604 707/999.1 |
| 2012/0324237 A1* | 12/2012 | D'Souza | G06F 21/6218 707/769 |
| 2016/0292445 A1* | 10/2016 | Lindemann | G06F 16/353 |
| 2019/0268379 A1* | 8/2019 | Narayanaswamy | H04L 63/0245 |
| 2021/0073179 A1* | 3/2021 | Berman | G06F 16/122 |
| 2021/0126823 A1* | 4/2021 | Poess | G06Q 10/10 |
| 2021/0303714 A1* | 9/2021 | Yaghoobi | G06N 20/00 |
| 2022/0103566 A1* | 3/2022 | Faulkner | H04L 67/535 |

FOREIGN PATENT DOCUMENTS

WO    WO-2022011144 A1 *    1/2022    ......... G06F 16/2457

* cited by examiner

*Primary Examiner* — Madhuri R Herzog
(74) *Attorney, Agent, or Firm* — Workman Nydegger (57) ABSTRACT

One example method includes receiving a request from a user to access data stored in a filesystem, in response to the request, retrieving metadata of the data and metadata of the user, validating the metadata of the data and the metadata of the user against a data access rule, and granting the user access to the data upon successful validation of the metadata of the data and the metadata of the user.

20 Claims, 5 Drawing Sheets

CLASSIFYING DATA AND ENFORCING DATA ACCESS CONTROL USING A CONTEXT-BASED HIERARCHICAL POLICY

FIELD OF THE INVENTION

Embodiments of the present invention generally relate to data access control. More particularly, at least some embodiments of the invention relate to systems, hardware, software, computer-readable media, and methods for implementing and using a context-based hierarchical policy as a basis for data access control.

BACKGROUND

Operating systems (OS) use file systems to organize files. Different operating systems have different file systems, with the result that access control mechanisms that are specific to operating systems do not transfer between file systems. That is, an access control system that functions with one operating system may not function with a different operating system. Therefore, permissions need to be redefined whenever a file is moved from one device to another. Further, due to inconsistency in access control implementations, administrators often find that a gap exists in access control capabilities from platform to platform.

Another concern with conventional data access control approaches is the introduction of human error. In particular, simple human mistakes in defining access control may lead to substantial damages if confidential, sensitive, or regulated files are leaked, incorrectly stored, or otherwise accessed by an entity that should not have been allowed access. A better approach would be to flag possible issues before they occur.

One approach that has been employed to deal with problems in managing data access control is the use of mechanisms such as Mandatory Access Control (MAC). However, while a MAC approach may provide adequate security, the stringent requirements of MAC add a substantial overhead and require expensive management systems and methods. Further, while fast-paced environments, such as banks, require extensive security guarantees, those environments cannot afford to incur the processing and operational lag that MAC approaches add.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data access control. More particularly, at least some embodiments of the invention relate to systems, hardware, software, computer-readable media, and methods for implementing and using a context-based hierarchical policy as a basis for data access control.

In general, example embodiments of the invention may operate to apply data access control at the file-system or object level using a context-based hierarchical policy. Example embodiments may would classify and annotate data, concatenate it with various forms of metadata, and leverage the available information to make granular access-control decisions, such as at the file level for example.

In an example embodiment, a user may request access to a particular file of a filesystem. The access request may trigger a hook which may then retrieve, from a catalog, metadata tags that have been associated with the file. The hook may then transmit the file metadata, and information concerning the user, to a security service. The security service may perform a validation process to validate the metadata and information, received from the hook, with one or more data access rules. If the validation is successful, the user may be granted access to the file, and if the validation is unsuccessful, access to the file may be denied.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may provide a content-based approach that enables flexibility in the application of access control processes. An embodiment may provide for granularity in the application of access control processes, which may be provided at the file or object level, for example. An embodiment may reduce the amount of performance and processing lag associated with application of access control processes. An embodiment may enable access control to be enforced on a file even if the file moves from one node to another.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which thousands, or tens of thousands, of data objects may be handled and processed by a data access control system. Such handling and processing, which may be performed in complex environments in which files are constantly being added, deleted, and modified, and in which access requirements are changing, is well beyond the mental capabilities of any human to perform practically, or otherwise. Thus, while other, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

A. Aspects of Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data access control operations.

At least some embodiments of the invention provide for the implementation of the disclosed functionality in existing data backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM).

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview

Access control mechanisms within data storage platforms, including those platforms that serve objects and files, may authorize subjects, such as users and processes, to perform operations, such as read, write, and delete, on resources within the underlying filesystem as managed by the operating system. OSs may support different variations of access control mechanisms.

One example access control mechanism that may be employed by an OS is MAC (Mandatory Access Control). MAC is a relatively strict mechanism, and may be employed by entities with high security requirements, such as government entities for example. Under a MAC implementation, only the system administrator may be allowed define/alter access to resource objects—users are not. A MAC system/approach may assign security labels to objects, which include a classification, such as 'Confidential,' and a category, such as 'Department X' or 'Project A.' A user attempting to access such objects would have to be associated with labels that match those assigned to the object. MAC is disfavored in many circumstances and applications as it imposes a substantial processing overhead due to its stringent requirements.

Another example access control mechanism that may be employed is DAC (Discretionary Access Control). Commercial operating systems may utilize DAC where users are responsible for defining access to resources they own. Access to the resource is defined as an Access Control List, which states the users and groups allowed to perform specific operations on the resource. While more flexible than a MAC approach, DAC offers weaker security guarantees and functionality than MAC.

A final example of an access control mechanism that may be employed in some circumstances is RBAC (Role-based Access Control). In this approach, RBAC assigns users "roles," where every role translates to specific permissions and access rights. RBAC imposes inflexibility in access control, since users cannot gain permissions more than those defined in the role to which they have been assigned.

While the MAC, DAC, and RBAC, approaches may be useful in certain circumstances, these mechanisms contrast with example embodiments at least in that none of these mechanisms provide support for content-based access control at the filesystem level, and access control decisions in these mechanisms are made based on "flat" information. That is, and in contrast with example embodiments, these access control approaches provide no support for, nor implement, utilization of a hierarchical policy comprised of attributes at multiple levels in a combined, uniform manner, to make access control decisions. Hierarchical levels employed in example embodiments may include, but are not limited to, user, group, and organizational unit, and embodiments may operate using extended metadata attributes, such as attributes identifying the types of content found within a particular piece of data. As disclosed herein, example embodiments may leverage AI/ML (Artificial Intelligence/Machine Learning) methods to extract useful metadata annotations from the underlying data, in addition to metadata annotations associated with users, in order to provide a facility to define and enforce access control.

C. Aspects of Some Example Embodiments

Example embodiments may use a context-based hierarchical policy to support finer access control decisions for the filesystem. Embodiments may include various components. Such components may include, for example, a metadata annotator that may operate to leverage human-defined rules alongside AI/ML to extract useful metadata from data.

Another component that may be included in some example embodiments is a data catalog. In general, the data catalog may store the extracted metadata to be used in making access control decisions.

Still another component that may be included in some embodiments is a security provider. In general, the security provider may serve as a policy decision point that may use various different hierarchical metadata to determine whether access to data is denied or granted.

As a final example of a component that may be included in some embodiments, one or more hooks may be provided. In general, a hook may listen for any filesystem changes, and, in response to detection of a filesystem change, triggering the metadata annotator or security provider as required. A security rule and/or file metadata may be automatically updated in response to a filesystem change, although it is noted that access permissions to the changed file may, or may not, change as a result of the filesystem change. For example, if PII is added to a file, the permissions may change, but if the change to the file does not add PII to the file, the permissions may remain the same as they were prior to that change.

Example embodiments may come into play at various stages during the lifecycle of a file or other dataset. For example, on file creation, the kernel underlying the filesystem may determine whether the user has permission to create a new file. At this stage, embodiments do not interfere with the file creation process, but simply defer to the underlying security implementation for the resource within which the file is being created.

Example embodiments may also implement various functionalities when a file is closed. For example, on a file close where file writes have been detected followed by the file close, a hook may be triggered. The hook may initially check the data catalog to determine if the file had any previous contents, that is whether or not a new file or simply a file revision had been created at close, and send the user and file metadata to the security provider to determine if these file writes are to be accepted, using a permission check mechanism. If the writes are accepted, that is, permitted, the hook may then package, and send, a reference of the new/modified file to the metadata annotator to retrieve, analyze, and generate metadata and annotations reflecting the changes. This information may then be stored within the data catalog.

As well, embodiments of the invention may implement functionalities when a user attempts to access a file, such as by opening or copying the file for example. When the user makes the access attempt, a hook may once again be triggered, and may send the user identity metadata, along with the file metadata, to a security provider. The security provider may then utilize a permission check mechanism to compare various different categories of metadata, such as user metadata, file metadata, and access request metadata, for example, against the defined policies or rules to determine whether the user can access the file to which access has been requested, and then, based on the comparison, the user may be either granted or denied access to the file.

Further, embodiments of the invention may implement various functionalities relating to file delete processes. For example, on file delete, such embodiments may adhere to a retention policy stated within the data catalog configurations. A retention policy may have different options, such as deleting the file immediately, deleting the file after passage of a specific time period, persisting the file indefinitely, or possibly a combination of these, according to the different tags on the file. For example a file retention policy may specify "delete immediately if 'PII,' else persist for 30 days if no sensitive tags found." Note that in this example policy, PII refers to Personal Identifying Information.

C.1 File Creation/Writing

Figure 1:
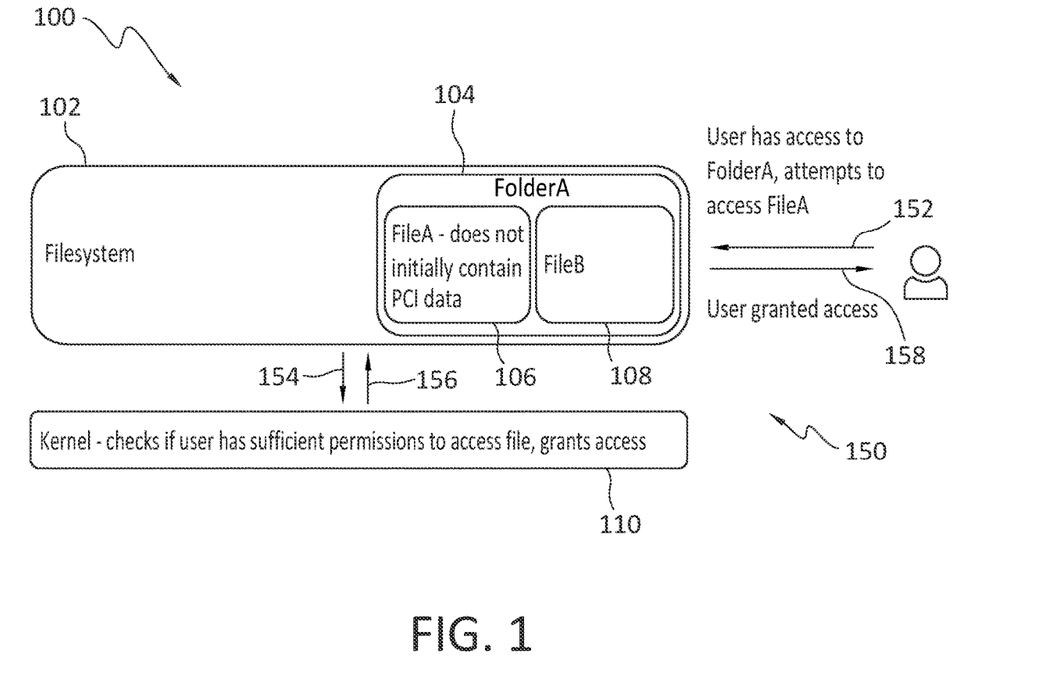
FIG. 1 discloses aspects of a hypothetical comparative example of a workflow for granting access to data.
Figure 2:
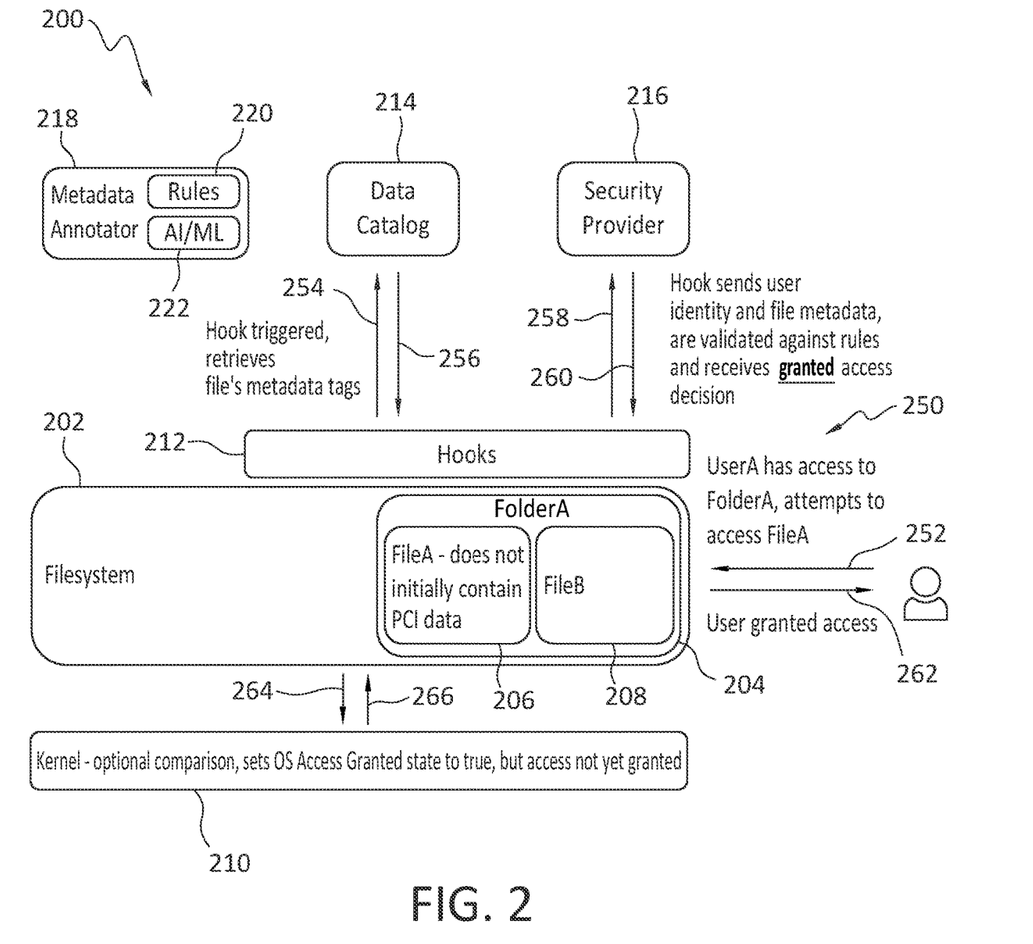
FIG. 2 discloses aspects of an example architecture and method, in which access is granted to data, according to some embodiments of the invention.

With attention now to FIGS. 1 and 2, details are provided concerning a hypothetical comparative example architecture and method (FIG. 1) and an example architecture and method of an embodiment of the invention (FIG. 2). The example architecture 100 of FIG. 1 includes a filesystem 102 that may include one or more filesystem folders 104, such as the example FolderA. The filesystem folder 104 may include one or more files 106 and 108, such as, respectively, FileA, which does not initially contain PCI (Personal Confidential Information) data, and FileB. A kernel 110 may underly the file system 102.

In this comparative example, both a UserA and a UserB may have access to FolderA. Based on this access configuration, when UserA attempts to access FileA, UserA will be granted access to FileA. In this comparative example, a workflow 150 may proceed as follows. UserA, who has access to FolderA, may request 152 access to FileA stored in FolderA, and the request may be conveyed 154 by the filesystem 102 to the kernel 110. In response to the request 152, the kernel 110 may check to determine if UserA has sufficient permissions to access FileA and, if so, the kernel 110 may indicate 156 to the filesystem 102 that the access request should be granted. On the other hand, if the kernel 110 determines that UserA does not have sufficient permissions to access FileA, the kernel 110 may indicate 156 to the filesystem 102 that the access request should be denied. In either case, the user may be informed of the decision. If the kernel 110 indicates that access should be granted, the filesystem 102 may grant 158 access to the user.

With attention to FIG. 2, and with the hypothetical comparative example of FIG. 1 in view, one example architecture 200 according to some embodiments is disclosed. Except as noted hereafter, the architecture 200 may the be same as the architecture 100.

The example architecture 200 may include, for example, a filesystem 202 that contains one or more folders 204 that may include, for example, a FileA 206 that does not initially contain PCI, and a FileB 208. A kernel 210 may underly the filesystem 202. In contrast with the example architecture 100, the architecture 200 may additionally comprise, as part of the filesystem 202, or separately from the filesystem 202, one or more hooks 212. The hooks 212 may communicate with a data catalog 214 and a security provider 216. Finally, a metadata annotator 218, which may include rules 220 and AI/ML functionality 222, may be included in the architecture 200.

In operation, a method 250 may be performed that may begin with a UserA request 252 for access to FileA. The request 252 may trigger a hook 212 to request 254, and receive 256, from the data catalog 214, one or more metadata tags that have been assigned to FileA. The metadata tags, along with metadata identifying the UserA who made the request 252, may then be provided 258 by the hook 212 to the security provider 216. The metadata tags and metadata may be generated, and associated with the file and user, by the metadata annotator 218 based on the rules 220 and/or by using AI/ML.

After receipt 258 of the metadata and metadata tags from the hooks 212, the security provider 216 may then validate the various metadata, provided 258 by the hooks, against one or more rules. Based on the outcome of the validation process, which may involve comparison of the metadata and metadata tags with one or more data access rules, the security provider 216 may grant/deny 260 the access request by UserA, and the decision of the security provider 216 may be communicated 262 by the filesystem 202 to the user. In some embodiments, the kernel 210 may set an OS Access Granted state to 'TRUE,' after receipt 264 of the decision of the security provider 216 from the filesystem 202. The kernel 210 may then inform 266 the filesystem 202 of the OS Access Granted state, even though access to the requested file may not yet have been granted 262.

C.2 File Modification

Figure 3:
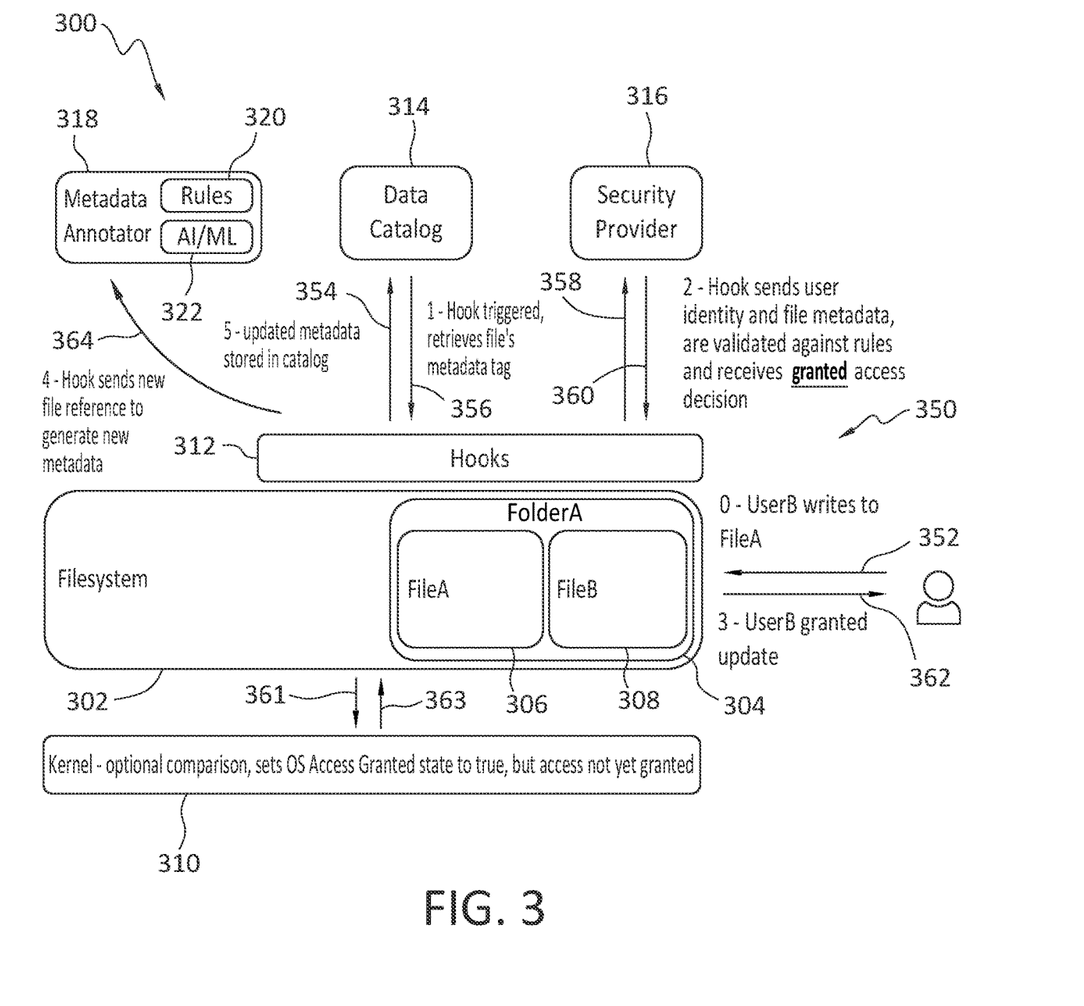
FIG. 3 discloses aspects of an example architecture and method, in which data that a user may be granted access to is updated, according to some embodiments of the invention.
Figure 4:
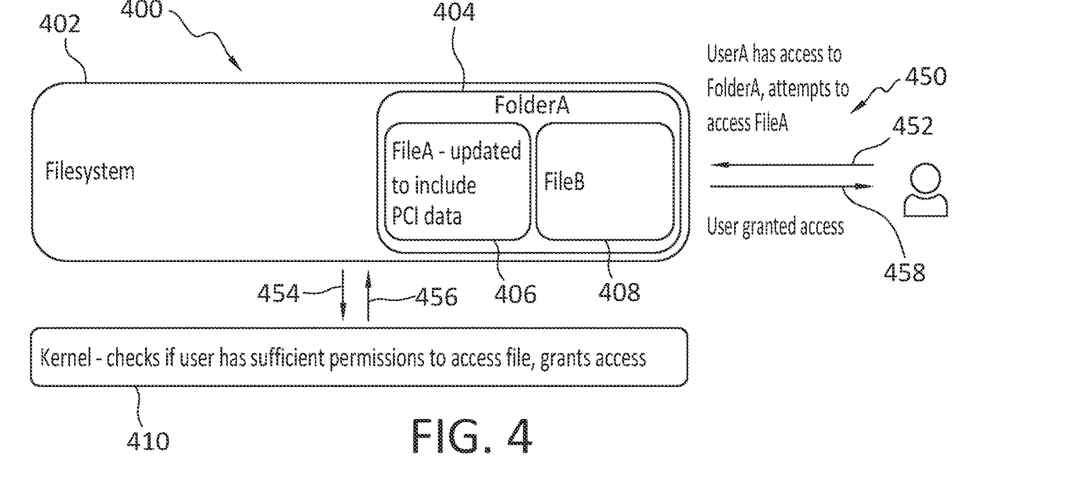
FIG. 4 discloses aspects of a hypothetical comparative example of a workflow in which access is erroneously granted to updated data.

With reference now to FIGS. 3 and 4, details are provided concerning the structure and operation of an embodiment of the invention in a circumstance where a user has added PCI data to FileA, that is, FileA has been modified by a different user, UserB in this case, to include PCI data. The example architecture 300 may be similar, or identical, in both structure and operation, to the architecture 200. As such, a detailed discussion of the architecture 300 is not provided, except to note that FileA 306 now includes PCI. In general, and similar to the architecture 200, the architecture 300 may comprise a filesystem 302, folder(s) 304, FileA 306, FileB 308, kernel 310, hooks 312, data catalog 314, security provider 316, and metadata annotator 318 with rules 320 and AI/ML functionality 322.

An example method 350 performed in connection with the architecture 300 may begin at 352 when UserB modifies FileA in some way, such as by adding PCI to FileA, for example. In this regard, it is noted that access control criteria may be set broadly so that any change to a file renders the file inaccessible to a party, or parties. In other embodiments, the access control criteria may be relatively granular such that, for example, access is denied only if the file has been modified to include confidential information.

In response to this change to FileA, the hook(s) 312 may be triggered to request 354, and receive 356, metadata tags of the file from the data catalog 314. The hook(s) 312 may then transmit 358 the user metadata and file metadata, received 356 from the data catalog 314, to the security provider 316. The security provider 316 may the validate the metadata received 358 from the hooks 304 against one or more data access rules and then transmit 360, based on the outcome of the validation, to the filesystem 302 a decision to grant access to UserB, that is, to allow UserB to write PCI data to FileA. Note that if the validation process performed by the security provider 316 fails, the decision would be to deny access to UserB, that is, to prevent UserB from writing PCI data to FileA. In the former case, the decision to grant access may then be communicated 362 by the filesystem 302 to the UserB.

During, and/or after, the writing of PCI data by UserB to FileA, the hook 312 may be triggered by modification of FileA to send 364 a new file reference to the metadata annotator 318 which may then generate new/modified file metadata corresponding to the change made by UserB to FileA, that is, the writing of PCI data by UserB to FileA. The new/modified file data may then be communicated 366 by the metadata annotator 318 to the data catalog 314 for storage at the data catalog 314.

In some embodiments, the kernel 310 may set an OS Access Granted state to 'TRUE,' after receipt 361 of the decision of the security provider 316 from the filesystem 302. The kernel 310 may then inform 363 the filesystem 302 of the OS Access Granted state, even though access to the requested file may not yet have been granted 362.

C.3 File (Modified) Access

With reference now to FIGS. 4 (hypothetical comparative example) and 5 (example embodiment), details are provided concerning a circumstance in which a UserA who initially had access to a FileA may be denied access to that FileA after another UserB has made changes to that FileA. An example method and architecture concerning access requests in the context of making changes to a file were discussed above in connection with FIGS. 2 and 3.

Turning first to FIG. 4, an architecture 400 may include a filesystem 402 with one or more folders 404, such as FolderA, that hold files 406 and 408, such as FileA and FileB, respectively. A kernel 410 may underly the filesystem 402. In FIG. 4, the file 406 may be a FileA that was updated by a UserB to include PCI data. Prior to this update, FileA may have been accessible both to UserA and UserB simply by virtue of the fact that both of those users had access to FolderA.

In the architecture 400 of FIG. 4, it may be possible for UserA to access the modified FileA, notwithstanding that the enterprise may wish to prevent UserA from having such access. In particular, a method 450 may begin when UserA, who has access to FolderA, requests access 452 to the modified FileA. In response to the request 452, the filesystem 402 may forward 454 the request to the kernel 410. The kernel 410 may check to determine if UserA has sufficient permissions to obtain access to the modified FileA. In the case of architecture 400, the check performed by the kernel 410 may simply determine that UserA has been granted access to FolderA and, as such, should be granted access to the files in FolderA, including the modified FileA which the entity does not wish UserA to be able to access.

However, the kernel 410 has determined that UserA has previously been granted access to FolderA, the kernel 410 may grant UserA access to the modified FileA. The kernel 410 may then communicate 456 the decision to grant UserA access to FileA to the filesystem 402. Accordingly, the filesystem 402 may then grant access 458 to UserA. Thus, even though the entity did not wish to permit UserA to access FileA, due to the inclusion of PCI, the architecture 400 nonetheless permitted such access.

Figure 5:
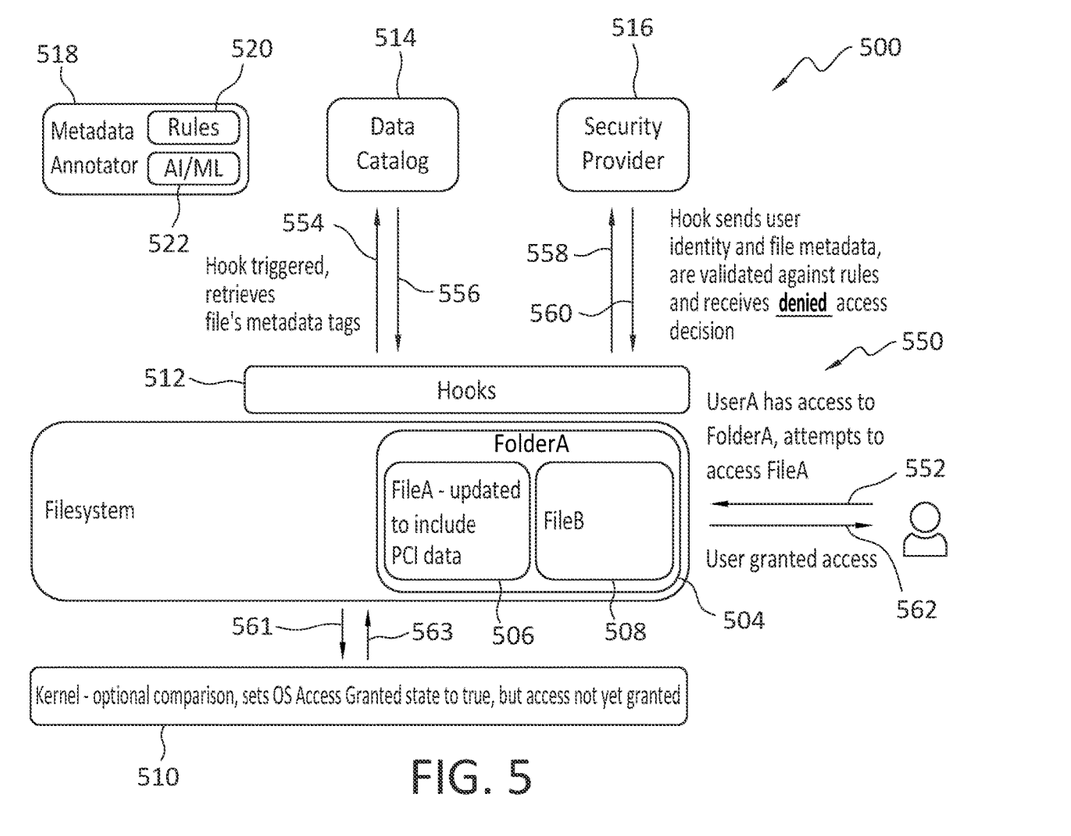
FIG. 5 discloses aspects of an example architecture and method, in which access is granted to updated data, according to some embodiments of the invention.

With reference now to FIG. 5, example embodiments of an architecture 500 and method 550 are disclosed that may prevent such a result. The example architecture 500 may be similar, or identical, in both structure and operation, to the architecture 300. As such, a detailed discussion of the architecture 500 is not provided, except to note that the architecture 500 may comprise a filesystem 502, folder(s) 504, FileA 506 which has been updated to include PCI information, FileB 508, kernel 510, hooks 512, data catalog 514, security provider 516, and metadata annotator 518 with rules 520, and AI/ML functionality 522 which may perform, for example, text analyses of the contents of file to generate new/modified metadata for that file. As with the other example rules 320, the rules 520 for creation of file metadata may specify that file metadata be generated based on keywords within file content, and relationships within the file content, for example.

An example method 550 may performed in connection with the architecture 500 which, in contrast with architecture/method 400/450 of FIG. 4, prevents unauthorized access to the modified FileA. In this way, the example embodiment of FIG. 5 may implement data access control at a file level, based on user metadata, access request metadata, and file metadata.

In more detail, the example method 550 may begin when UserA, who has access to FolderA, requests access 552 to the modified FileA, which is contained in FolderA, that was generated by UserB. The access request 552 may trigger the hook(s) 512 to request 554, and receive 556, metadata tags of the FileA from the data catalog 514. The hook(s) 512 may then transmit 558 the user metadata and file metadata, received 556 from the data catalog 514, to the security provider 516. The security provider 516 may the validate the metadata received 558 from the hooks 504 against one or more data access rules and then transmit 560, based on the outcome of the validation, to the filesystem 502 a decision to deny access to UserA, that is, to prevent UserA from accessing the FileA which was modified by UserB to include PCI data. The denial of access may then be communicated 562 by the filesystem 502 to the UserA.

During, and/or after, the writing of PCI data by UserB to FileA, the hook 312 may be triggered by modification of FileA to send 364 a new file reference to the metadata annotator 318 which may then generate new/modified file metadata corresponding to the change made by UserB to FileA, that is, the writing of PCI data by UserB to FileA. The new/modified file data may then be communicated 366 by the metadata annotator 318 to the data catalog 314 for storage at the data catalog 314.

In some embodiments, the kernel 510 may set an OS Access Granted state to 'TRUE,' after receipt 561 of the decision of the security provider 516 from the filesystem 502. The kernel 510 may then inform 563 the filesystem 502 of the OS Access Granted state. That is, the kernel 510 may erroneously indicate that access to FileA should be granted to UserA when, in fact, UserA should not have access to the FileA. Thus, example embodiments may operate to override incorrect file access determinations that may be made by a kernel.

It is noted with respect to the example methods of FIGS. 2, 3, and 5, discussed above, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Finally, it is noted that data access permissions implemented using a context-based hierarchy, as disclosed herein, may be used alone or alongside traditional security settings. That is, example embodiments may be implemented in both greenfield environments where data access controls have yet to be implemented, and brownfield environments where some form of data access control has been implemented.

D. Further Discussion

As disclosed herein, example embodiments may possess various useful features and functionalities. For example, embodiments may implement a context-based hierarchical access control decisions for underlying file data triggered by and at the file system level. More specifically, example embodiments may augment existing local access control decisions, as disclosed herein, by enabling access to be enforced based on user identity metadata and the metadata associated with the object to which access has been, or may be, requested. This approach may enable more granularity and access control based on the actual content of the file or other dataset.

As another example, some embodiments may implement data classification of underlying file data. Particularly, example embodiments may employ human-defined rules alone, or alongside AI/ML methods, to generate content-based metadata for files and objects, which metadata may be used to classify data into different categories. For example, files may be scanned to generate metadata, and then to annotate that metadata should the file contain sensitive information such as PII (Personally Identifiable Information), financial transactions, or intellectual property, for example.

Further, some example embodiments may define and enforce security policies, that is, data access policies, that may follow the data to various locations or sites through hook invocation of context-based hierarchical access control. In more detail, some example embodiments may provide another mechanism of safety in that, where employed, the security policy would naturally follow the data using the metadata associated with that data. As access requests are initiated against a given resource such as a data object, hooks may be invoked requesting validation that the supplied identity context, that is, the requesting user, could access the resource given the metadata and annotations that have been identified for that resource. In this way, if a file or object were copied or moved from one node to another, and assuming each node employs the techniques disclosed herein, the policy as defined may be enforced at any node where the data is located. Thus, example embodiments of the invention may support the application of security policies regardless of how the files are accessed, be it directly from the filesystem, using a terminal, from a catalog, or even from a program.

Another useful functionality that may be implemented by some example embodiments is the automated metadata generation and annotation of new and changed data. That is, some example embodiments may allow new or changed data to be automatically analyzed, have metadata generated, and have annotations created within the metadata based on the contents, or changes found, within the file. These processes may be automatically triggered when a change to a file is detected.

As well, some example embodiments may reduce, or eliminate, a time gap between when new content is created, and creation and/or enforcement of an access policy concerning that new content. For example, some embodiments may enable a data security policy to be enacted in near-real-time, as new or changed data may have immediate metadata and annotation generation requested against it.

As a final example, some embodiments may provide for a metadata-based access audit trail with enforcement record. In particular, some embodiments may allow security operations to analyze access request denials with detailed understanding of the metadata/tags which triggered the denial. This may be useful for the detection of bad actors, and/or identification of poorly delineated rule sets that may need to be edited.

E. Further Example Embodiments

Following are some further example embodiments of the invention. These are presented only by way of example and are not intended to limit the scope of the invention in any way.

Embodiment 1. A method, comprising: receiving a request from a user to access data stored in a filesystem; in response to the request, retrieving metadata of the data and metadata of the user; validating the metadata of the data and the metadata of the user against a data access rule; and granting the user access to the data upon successful validation of the metadata of the data and the metadata of the user.

Embodiment 2. The method as recited in embodiment 1, wherein access to the data by the user is granted or denied based on a combination of user identity and content of the data.

Embodiment 3. The method as recited in any of embodiments 1-2, wherein the data access rule is enforceable regardless of a location of the data.

Embodiment 4. The method as recited in any of embodiments 1-3, wherein other data in a same folder as the data is not accessible to the user.

Embodiment 5. The method as recited in any of embodiments 1-4, wherein the metadata of the data is updated and stored, automatically, in response to a change to the data.

Embodiment 6. The method as recited in any of embodiments 1-5, wherein the data access rule is updated automatically in response to a change in the data, and the data access rule is enforceable immediately after it has been updated.

Embodiment 7. The method as recited in any of embodiments 1-6, wherein the metadata includes annotations that are based on content of the data.

Embodiment 8. The method as recited in any of embodiments 1-7, wherein the data metadata is generated according to one or more rules.

Embodiment 9. The method as recited in any of embodiments 1-8, wherein the data access rule is applicable at an individual data object level.

Embodiment 10. The method as recited in any of embodiments 1-9, wherein the access request comprises a request to read the data or a request to write to the data.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
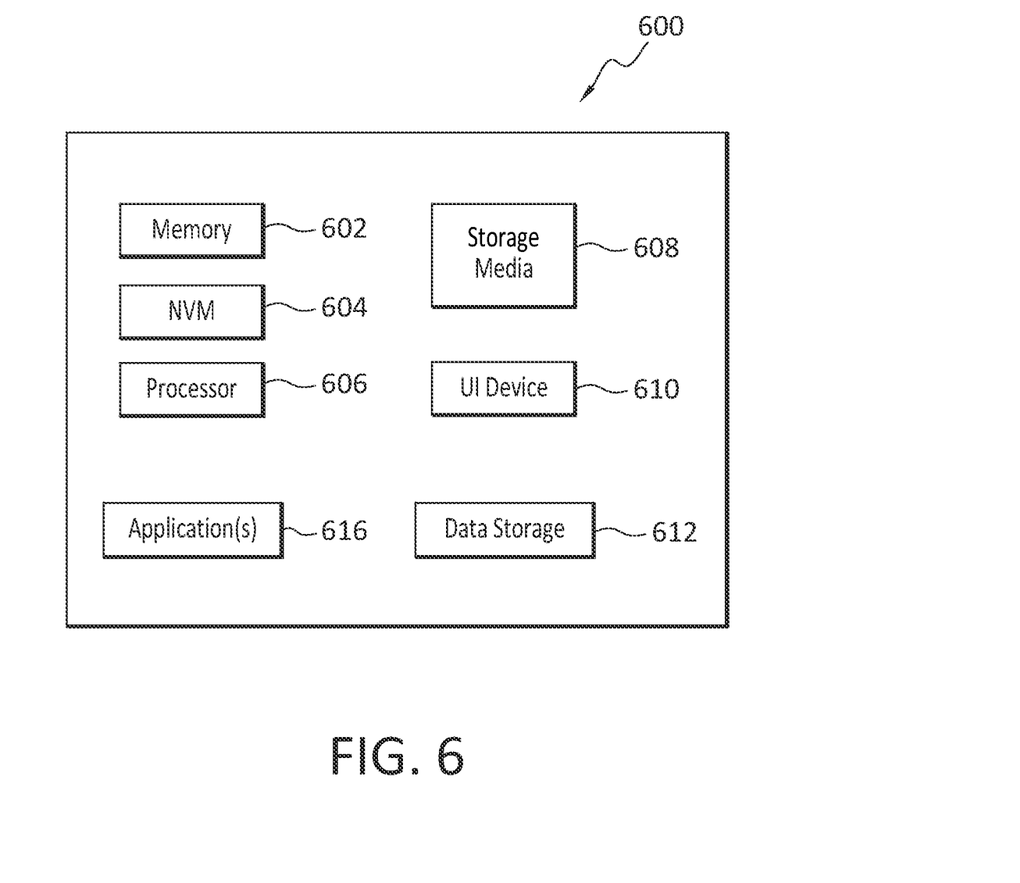
FIG. 6 discloses aspects of an example computing entity operable to perform any of the disclosed methods, operations, and processes.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 500 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a request from a user to access data stored in a filesystem;
   generating access request metadata based on the request from the user;
   in response to the request, retrieving metadata of the data and metadata of the user;
   validating the metadata of the data, the metadata of the user, and the access request metadata against a data access rule which is an element of a context-based hierarchical policy, and the data access rule follows the data and is enforced by an entity external to the data, wherever the data is located, and the data access rule is enforced regardless of how the data is requested to be accessed;
   granting the user access to the data upon successful validation of the metadata of the data and the metadata of the user; and
   when a kernel underlying the filesystem, and operable to perform data access checks in conjunction with a security provider and communicate data access decisions, erroneously generates an indication to the filesystem that access to the data should be granted to the user, overriding the indication and denying access to the data by the user.

2. The method as recited in claim 1, wherein access to the data by the user is granted or denied based on a combination of user identity and content of the data.

3. The method as recited in claim 1, wherein other data in a same folder as the data is not accessible to the user.

4. The method as recited in claim 1, wherein the metadata of the data is updated and stored, automatically, in response to a change to the data.

5. The method as recited in claim 1, wherein the data access rule is updated automatically in response to a change in the data, and the data access rule is enforceable immediately after it has been updated.

6. The method as recited in claim 1, wherein the metadata includes annotations that are based on content of the data.

7. The method as recited in claim 1, wherein the data metadata is generated according to one or more rules.

8. The method as recited in claim 1, wherein the data access rule is applicable at an individual data object level.

9. The method as recited in claim 1, wherein the access request comprises a request to read the data or a request to write to the data.

10. A non-transitory computer readable storage medium having stored therein instructions that are executable by one or more hardware processors to perform operations comprising:
   receiving a request from a user to access data stored in a filesystem;
   generating access request metadata based on the request from the user;
   in response to the request, retrieving metadata of the data and metadata of the user;
   validating the metadata of the data, the metadata of the user, and the access request metadata against a data access rule which is an element of a context-based hierarchical policy, and the data access rule follows the data and is enforced by an entity external to the data, wherever the data is located, and the data access rule is enforced regardless of how the data is requested to be accessed;
   granting the user access to the data upon successful validation of the metadata of the data and the metadata of the user; and
   when a kernel underlying the filesystem, and operable to perform data access checks in conjunction with a security provider and communicate data access decisions, erroneously generates an indication to the filesystem that access to the data should be granted to the user, overriding the indication and denying access to the data by the user.

11. The non-transitory computer readable storage medium as recited in claim 10, wherein access to the data by the user is granted or denied based on a combination of user identity and content of the data.

12. The non-transitory computer readable storage medium as recited in claim 10, wherein other data in a same folder as the data is not accessible to the user.

13. The non-transitory computer readable storage medium as recited in claim 10, wherein the metadata of the data is updated and stored, automatically, in response to a change to the data.

14. The non-transitory computer readable storage medium as recited in claim 10, wherein the data access rule is updated automatically in response to a change in the data, and the data access rule is enforceable immediately after it has been updated.

15. The non-transitory computer readable storage medium as recited in claim 10, wherein the metadata includes annotations that are based on content of the data.

16. The non-transitory computer readable storage medium as recited in claim 10, wherein the data metadata is generated according to one or more rules.

17. The non-transitory computer readable storage medium as recited in claim 10, wherein the data access rule is applicable at an individual data object level.

18. The non-transitory computer readable storage medium as recited in claim 10, wherein the access request comprises a request to read the data or a request to write to the data.

19. The method as recited in claim 1, wherein prior to receipt of the request, the data was modified by a user other than the user who requested access to the data.

20. The non-transitory computer readable storage medium as recited in claim 10, wherein prior to receipt of the request, the data was modified by a user other than the user who requested access to the data.

* * * * *